United States Patent
Lin

(10) Patent No.: US 9,459,119 B2
(45) Date of Patent: Oct. 4, 2016

(54) AIRCRAFT GUIDANCE SYSTEM HAVING REVIEWING AND VIDEO SYNCHRONIZATION ABILITIES, AND REVIEWING AND VIDEO SYNCHRONIZATION DEVICE OF THE SAME

(71) Applicant: UNIBASE INFORMATION CORP., New Taipei (TW)

(72) Inventor: Cheng-Hsiang Lin, New Taipei (TW)

(73) Assignee: Unibase Information Corp., New Taipei (TW)

( * ) Notice: Subject to any disclaimer, the term of this patent is extended or adjusted under 35 U.S.C. 154(b) by 0 days.

(21) Appl. No.: 14/645,720

(22) Filed: Mar. 12, 2015

(65) Prior Publication Data
US 2015/0276427 A1    Oct. 1, 2015

(30) Foreign Application Priority Data
Mar. 31, 2014   (TW) .............................. 103205514 U

(51) Int. Cl.
| | | |
|---|---|---|
| *G08B 21/00* | (2006.01) | |
| *G08G 5/00* | (2006.01) | |
| *G01C 23/00* | (2006.01) | |
| *B64F 1/00* | (2006.01) | |
| *B64D 47/08* | (2006.01) | |

(52) U.S. Cl.
CPC .............. *G01C 23/00* (2013.01); *B64D 47/08* (2013.01); *B64F 1/002* (2013.01)

(58) Field of Classification Search
CPC ........... G01C 23/00; G01S 1/70; G01S 1/02; B64F 1/002; B64D 47/08
USPC ................ 340/973, 958; 348/117, 123, 14.1; 701/120, 300, 3; 356/153, 4.01, 141.2
See application file for complete search history.

(56) References Cited

U.S. PATENT DOCUMENTS

| | | | | |
|---|---|---|---|---|
| 3,729,262 A | * | 4/1973 | Snead | B64F 1/002 114/261 |
| 3,999,007 A | * | 12/1976 | Crane | G01S 1/02 342/182 |
| 4,184,655 A | * | 1/1980 | Anderberg | B64F 1/002 116/29 |
| 4,994,681 A | * | 2/1991 | Mann | B64F 1/002 250/559.3 |
| 5,166,746 A | * | 11/1992 | Sato | B64F 1/002 340/958 |
| 5,889,479 A | * | 3/1999 | Tabel | B64F 1/002 340/958 |
| 6,100,964 A | * | 8/2000 | De Cremiers | B64F 1/002 340/958 |
| 6,690,295 B1 | * | 2/2004 | De Boer | G08G 5/0026 340/933 |
| 6,704,098 B2 | * | 3/2004 | Anderberg | B64F 1/002 356/139.04 |
| 9,047,771 B1 | * | 6/2015 | Thoreen | G08G 5/0021 |
| 2003/0160709 A1 | * | 8/2003 | Westlund | B64D 47/08 340/958 |

(Continued)

*Primary Examiner* — Hoi Lau
(74) *Attorney, Agent, or Firm* — Rosenberg, Klein & Lee

(57) ABSTRACT

An aircraft guidance system includes a reviewing and video synchronization device connected to a display panel. The display panel receives and displays guidance status of an aircraft. The reviewing and video synchronization device includes an operator panel, a video recording unit and a built-in recording unit. The operator panel includes a display screen and a plurality of keys. The display screen and the display panel synchronizedly display information. The video recording unit records the information displayed on the display screen. The built-in recording unit records the scanning signals and time stamps received by the display panel.

10 Claims, 3 Drawing Sheets

(56) References Cited

U.S. PATENT DOCUMENTS

| | | | |
|---|---|---|---|
| 2005/0140540 A1* | 6/2005 | Rees | G01S 13/723 342/29 |
| 2007/0222969 A1* | 9/2007 | Millgard | B64F 1/002 356/4.01 |
| 2008/0098538 A1* | 5/2008 | Hutton | B64F 1/3055 14/71.5 |
| 2008/0157947 A1* | 7/2008 | Hutton | G08G 5/065 340/435 |
| 2008/0231472 A1* | 9/2008 | Hutton | B64F 1/3055 340/958 |
| 2008/0231474 A1* | 9/2008 | Chang | G08G 5/0082 340/983 |
| 2009/0009596 A1* | 1/2009 | Kerr | G01S 1/70 348/117 |
| 2009/0052858 A1* | 2/2009 | Date | H04N 9/67 386/300 |
| 2009/0099761 A1* | 4/2009 | Davis | G08G 5/0026 701/120 |
| 2010/0096491 A1* | 4/2010 | Whitelaw | A63K 3/00 244/15 |
| 2012/0154609 A1* | 6/2012 | Ozaki | H04N 5/765 348/207.99 |
| 2012/0281963 A1* | 11/2012 | Krapf | G06Q 30/02 386/239 |
| 2013/0060457 A1* | 3/2013 | Breuing | G08G 1/167 701/120 |
| 2013/0106808 A1* | 5/2013 | Shiraishi | G06F 1/1694 345/204 |
| 2013/0194437 A1* | 8/2013 | Osman | H04N 5/2621 348/207.1 |
| 2014/0129125 A1* | 5/2014 | Ovens | G08G 5/0021 701/300 |
| 2014/0205259 A1* | 7/2014 | Kamity | H04N 5/76 386/201 |
| 2014/0278904 A1* | 9/2014 | Seiden | G06Q 30/0217 705/14.36 |
| 2014/0297168 A1* | 10/2014 | Ovens | G01C 21/3626 701/120 |
| 2014/0307727 A1* | 10/2014 | Cha | H04W 56/00 370/350 |
| 2014/0334794 A1* | 11/2014 | Walker | G06T 11/206 386/219 |
| 2015/0142214 A1* | 5/2015 | Cox | G05D 1/0083 701/3 |
| 2015/0215665 A1* | 7/2015 | Casagrande | H04N 21/233 725/32 |
| 2015/0276427 A1* | 10/2015 | Lin | G01C 23/00 340/973 |

* cited by examiner

AIRCRAFT GUIDANCE SYSTEM HAVING REVIEWING AND VIDEO SYNCHRONIZATION ABILITIES, AND REVIEWING AND VIDEO SYNCHRONIZATION DEVICE OF THE SAME

BACKGROUND OF THE INVENTION

1. Field of the Invention

The present disclosure relates to an aircraft guidance system which has reviewing and video synchronization abilities; in particular to an aircraft guidance system for detecting an aircraft carrier and guiding a pilot to a docking position, and further providing an operation panel for ground operators.

2. Description of Related Art

Visual docking guidance systems are electronic devices arranged on gates over aprons for guiding an aircraft to dock at aprons or gates. This guidance system detects the position of an aircraft and provides visual signals to the pilot for docking the aircraft. Advanced visual docking guidance systems can accurately detect the position of an aircraft. Usually, a large display panel is disposed in front of the docking position of the aircraft at a height of six to eight meters, roughly equal to the height of the aircraft so the pilot can easily see the display panel. The large display panel displays the orientation and distance of the aircraft and guides the pilot to the correct docking position.

An advanced visual docking guidance system is further equipped at the gate with an operator panel, usually arranged proximal to a passenger boarding bridge and operated by the ground crew. An advanced visual docking guidance system usually requires the ground crew to input the model of the aircraft to be docked. When the aircraft to be docked enters the range of guidance, the guidance system displays the set model to the pilot. If the pilot sees a model different from that of the aircraft, he immediately stops the aircraft and notifies the ground crew.

When operating the above guidance system, the ground crew cannot by reading the operator panel identify the content displayed by the display panel. The ground crew must look at both the operator panel and the display panel in order to review the information displayed to the pilot. This method of operation requires the ground crew to look at displays from two places and is inconvenient.

Additionally, when accidents happen during docking of an aircraft, responsibilities must be assigned to the pilot or the guidance system. Therefore, a method of reviewing causes for error is essential.

SUMMARY OF THE INVENTION

The object of the present disclosure is to provide a reviewing and video synchronization device for guiding an aircraft, wherein the information displayed on the display panel of an advanced visual docking guidance system is also displayed on an operator panel, such that a ground crew can read only content displayed by the operator panel to know the content displayed to the pilot by the display panel, facilitating operation for the ground crew.

Another object of the present disclosure is to provide a reviewing and video synchronization device for guiding an aircraft, wherein recording tools record the content displayed on the operator panel and the display panel for reviewing purposes.

In order to achieve the aforementioned objects, an embodiment of the present disclosure provides a reviewing and video synchronization device for guiding an aircraft and connected to a display panel. The aircraft guidance system detects an aircraft and displays the guidance status of the aircraft on the display panel. The reviewing and video synchronization device for guiding an aircraft includes an operator panel, a video recording unit, and a built-in recording unit. The operator panel includes a display screen and a plurality of keys arranged outside the display screen for a ground crew to input operating signals. The display screen is connected by a connecting unit to the display panel and synchronizedly displays the graphic content displayed on the display panel. The video recording unit records the content displayed on the display panel. The built-in recording unit records scanning signals received by the display panel and the time at which the scanning signals are recorded.

In order to achieve the aforementioned objects, the present disclosure further provides an aircraft guidance system having reviewing and video synchronization abilities, including a laser scanner which emits a laser beam for scanning and detecting an aircraft and returning a scanning signal; a display panel having a plurality of micro display units, and configured to receive the scanning signals returned by the laser scanner and accordingly display the guidance status of the aircraft; an operator panel including a display screen and a plurality of keys arranged outside the display screen for a ground crew to input operating signals, wherein the display screen is connected by a connecting unit to the display panel and synchronizedly displays the graphic content displayed on the display panel; a video recording unit for recording the content displayed on the display panel; and a built-in recording unit for recording the scanning signals received by the display panel and the time at which the scanning signals are recorded.

The present disclosure has the following potential advantages. The display screen viewed by the ground crew can synchronizedly and graphically display the content displayed by the display panel to the pilot, facilitating operation for the ground crew. The video recording unit records the content displayed on the display panel, and the built-in recording unit records the scanning signals received by the display panel and the time the scanning signals are recorded at, for settling disputes between the pilot and the ground crew over responsibilities for accidents.

In order to further the understanding regarding the present disclosure, the following embodiments are provided along with illustrations to facilitate the disclosure of the present disclosure.

DETAILED DESCRIPTION OF THE PREFERRED EMBODIMENTS

Figure 1:
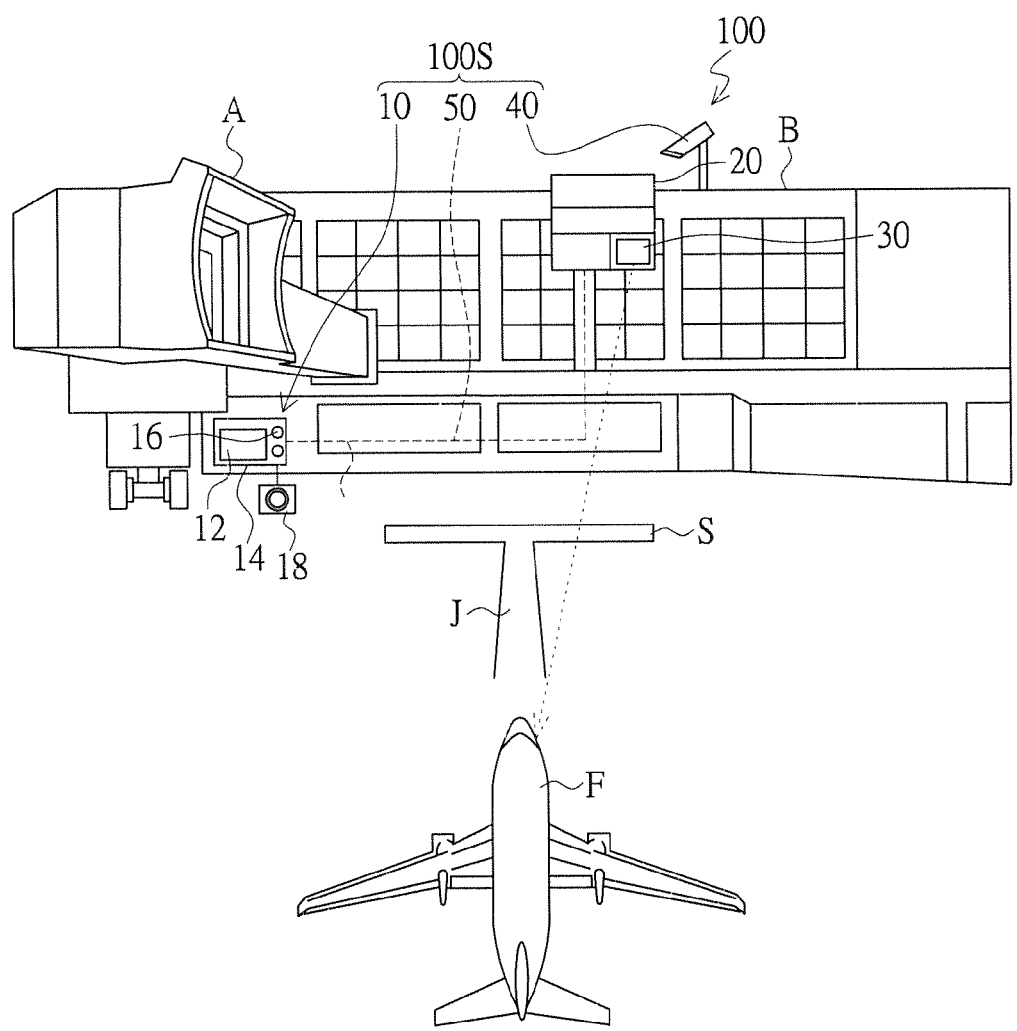
FIG. 1 shows a schematic diagram of a reviewing and video synchronization device for guiding an aircraft according to the present disclosure.
Figure 2:
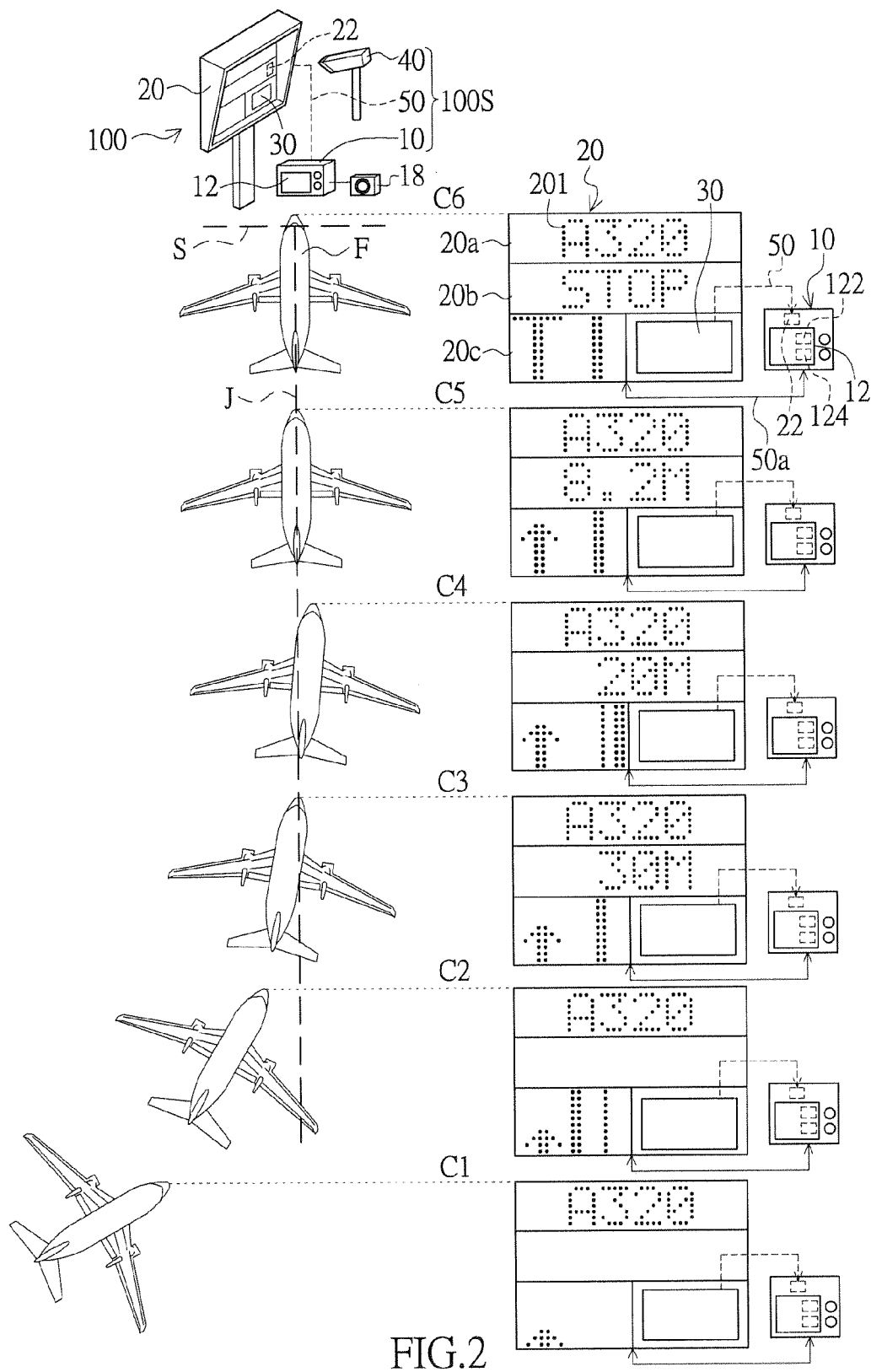
FIG. 2 shows a schematic diagram of guiding an aircraft along a line to a stop line according to the present disclosure.

FIG. 1 and FIG. 2 respectively show a schematic diagram of a reviewing and video synchronization device for guiding an aircraft according to the present disclosure and a schematic diagram of guiding an aircraft along a J-line to a stop line according to the present disclosure. The present embodiment provides an aircraft guidance system having reviewing and video synchronization abilities 100, hereafter referred to as an aircraft guidance system. The aircraft guidance system 100 includes an upgradeable reviewing and video synchronization device for guiding an aircraft 100S, hereafter referred to as a reviewing and video synchronization device.

The aircraft guidance system 100 includes an electronic display panel 20 for showing guidance information of an aircraft F to the pilot therein, and a laser scanner 30 for scanning the aircraft F. The laser scanner 30 shoots a laser beam at the nose of the aircraft F, and the system calculates the time needed for the laser beam to bounce back to determine the distance of the aircraft F from the laser scanner 30. Guidance information confirmed by a ground crew is displayed on the electronic display panel 20, for showing the guidance status of the aircraft F. The electronic display panel 20 of the present embodiment is a large LED display panel having a plurality of micro display units, and together with the laser scanner 30 is installed on an airport building B. However, the electronic display panel 20 may also be installed on a column. The reviewing and video synchronization device 100S is connected to the electronic display panel 20 of the aircraft guidance system 100.

As shown on the right of FIG. 2, the reviewing and video synchronization device 100S includes a connection unit 50 connected to the display panel 20, an operator panel 10, a video recording unit 122, a built-in recording unit 22. The connection unit 50 can be a communication cable in compliance with the RS232 standard, for connecting the operator panel 10 to the display panel 20 for transmitting commands and signals.

The scanning signals and timing sequence thereof obtained by the laser scanner 30 can be transmitted to the operator panel 10 by a control unit (omitted in the figures). The ground crew then confirms the information shown on the operator panel 10 and inputs commands thereto, which are then transmitted to the display panel 20 for displaying guidance information, thereby achieving the effect of the operator panel 10 displaying the same information as the display panel 20.

As shown in FIG. 1, the operator panel 10 is typically disposed in front of a stop line S and proximal to a passenger boarding bridge A. The operator panel 10 includes a display screen 12 and a plurality of keys 16 arranged outside the display screen 12 for a ground crew to input operating signals, such as an emergency stop signal.

FIG. 2 shows the aircraft F proximal to the J-line J (status C1), and reaching the stop line S along the J-line J (status C2 to status C6). Before the aircraft F enters the J-line J, the ground crew identifies the model of the aircraft F (e.g. A320), and inputs the model to the operator panel 10. The aircraft guidance system 100 obtains physical features of the aircraft F through the laser scanner 30, determines whether the input model is correct, and the control unit (not shown in the figures) of the laser scanner 30 transmits a scanning signal through the connection unit 50 to the operation panel 10 for the ground crew's reference. After the ground crew has read the status of the aircraft F from the operator panel 10 and identified the model of the aircraft F, the ground crew can input an operation signal to the operator panel 10. The operation panel 10 integrates the operation signal with the scanning signal into an integrated guidance information, and the integrated guidance information is transmitted to the control unit (not shown in the figures) of the display panel 20 through a transmitting unit 50*a*. The integrated guidance information is synchronously displayed on the electronic display panel 20 of the aircraft guiding system 100 and the mirroring display region 121 of the display screen 12.

FIG. 2 shows the process of guiding the aircraft F. In status C1, the laser scanner 30 detects the aircraft F and initiates the aircraft guidance system 100. A signal is transmitted to the operator panel 10. The ground crew confirms the detection of the aircraft F and inputs the model of said aircraft F, which is transmitted to the display panel 20 and displayed thereat for the pilot's reference. The model of the aircraft F is also synchronizedly displayed at the display screen 12 of the operator panel 10 for the ground crew's reference.

In status C2, the display panel 20 shows that the aircraft F (represented by the double lines) is to the left of the J-line J (represented by the single line), so that the pilot moves the aircraft F rightward.

In status C3, a central display region 20*b* of the display panel 20 indicates that the aircraft F is 30 meters away from the stop line S, and that the aircraft F is on the J-line J, formally in the guidance range. The pilot continues to drive the aircraft F forward.

In status C4, the display panel 20 indicates that the aircraft F is 20 meters away from the stop line S, and that the aircraft F is to the right of the J-line J, reminding the pilot to move the aircraft F leftward.

In status C5, the display panel 20 indicates that the aircraft F is 8.2 meters away from the stop line S, and that the aircraft F is on the J-line J, gradually approaching the stop line S.

In status C6, the display panel 20 indicates that the aircraft F is at the stop line and the central display region 20*b* shows "STOP." The lower left display region 20*c* shows a "T" which indicates the aircraft F to stop moving.

The present embodiment, after integration of input signals from the ground crew through the operator panel 10, transmits to the display panel 20 through the transmitting unit 50*a* and synchronizedly transmits to the display screen 12, such that the ground crew can operate without having to look at the display panel 20 overhead.

As shown in FIG. 2, the present embodiment preferably includes a video recording unit 122 built in to the operator panel 10 for recording information displayed on the display screen 12. The video recording unit 122 can start recording once the ground crew inputs a password to the display screen 12, thereafter including keying of the model of the aircraft F to be guided, and then the graphic is changed to be synchronizedly displayed with the display panel 20. The video recorded by the video recording unit 122 can be reviewed to settle a dispute between the pilot and the ground crew over responsibilities for error. An advantage of this type of built in recording unit is that it is not affected by the external environment.

The video recording unit 122 can record the display panel 12 by using an image scanner 124, as shown in FIG. 2. The image scanner 124 can be arranged at the operator panel 10, sequentially scanning (e.g. line after line) every pixel of the display screen.

Additionally, the present embodiment records the display information of the display panel 20 through the built-in recording unit 22 for reviewing. The display panel 20 has an output terminal for sending through the transmitting unit 50*a* the display information of the display panel 20 to the operator panel 10. The built-in recording unit 22 is preferably disposed at the operator panel 10 and connected to the display panel 20 through the transmitting unit 50*a*, recording scanning signals and time stamps thereof transmitted by the transmitting unit 50a. Like the black box, scanning signals and time stamps received by the display panel 20 can be recorded.

The built-in recording device 22 can be any type of electronic memory device. The following shows examples of recorded data.

00:00:45.7 0 represents time stamp;
$DAWAIT 0000002A
represents display of word string ($D) "WAIT" to region A (i.e. upper display region 20a);
00:00:45.8 0 represents another time stamp;
$DAA320 200 43
represents display of word string ($D) "A320" to region A (i.e. the upper display region 20a);
... (omitted) ...
00:00:46.0 0 represents another time stamp;
$DB3.0M 00000042
represents display of word string ($D) "3.0M" to region B (i.e. central display region 20b);
00:00:46.1 0 represents another time stamp;
$DB2.8M 0000004B
represents display of word string ($D) "2.8M" to region B (i.e. central display region 20b)

Referring to FIG. 1, the aircraft guidance system 100 further includes an emergency switch 18 connected to the operator panel 10, for stopping operation during emergencies. Additionally, the operator panel 10 of the present embodiment further includes waterproof casing 14 enclosing the display screen 12. The keys 16 are disposed outside the waterproof casing 14. Additionally the reviewing and video synchronization device 100S can further include a video camera 40 arranged in front of the display panel 20 for recording the display panel 20, as supplemental recording for reviewing.

Figure 3:
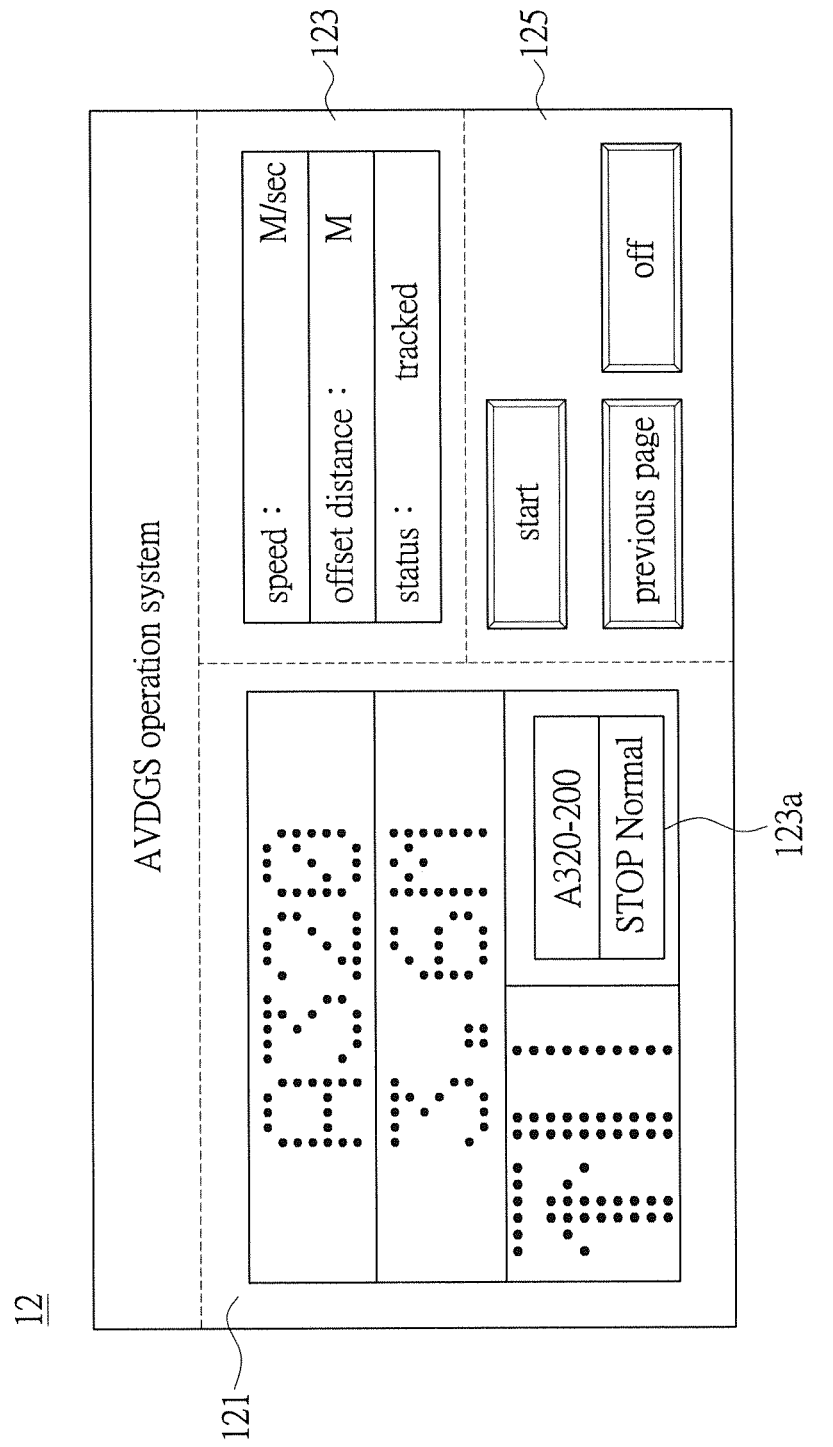
FIG. 3 shows a schematic diagram of a display screen according to the present disclosure.

Referring to FIG. 3, the display screen 12 of the present embodiment can be a touchscreen including a mirroring display region 121 for displaying the image shown on the display panel 20, at least one supplemental information region 123, 123a, for displaying other information about the aircraft F (such as aircraft velocity, aircraft offset distance, aircraft model, guidance status, warning signals, etc), and a touchscreen key region 125. The keys in the touchscreen key region 125 can be modified according to need.

The aircraft guidance system of the present disclosure can include a plurality of operator panels 10 connected to servers and backup servers. The recorded images of the operator panels 10 can be saved in the servers.

In summary of the above, the present disclosure has the following advantages. The operator panel 10 has a display screen 12 which synchronizedly displays the information displayed on the display panel 20, such that the ground crew guiding the aircraft F does not need to raise his head to look at the display panel 20, facilitating operation. Additionally, the video recording unit 122 records the information displayed on the display screen 12 for review at a later time. Moreover, the built-in recording device 22 records the scanning signals and time stamps received by the display panel 20, and like a black box can record the scanning signals for review at a later time.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A reviewing and video synchronization device for aircraft docking guidance process, comprising:
   an operator panel having a display screen and a plurality of keys for generating an operation signal for guiding the aircraft, wherein the display screen of the operator panel includes a mirroring display region; wherein a scanning signal from an aircraft guiding system is transmitted to the operator panel, wherein the scanning signal includes an guidance information for guiding the aircraft to a predetermined position, and the guidance information is firstly displayed on an electronic display panel of the aircraft guiding system;
   wherein the operator panel integrates the operation signal with the scanning signal into an integrated guidance information, and the integrated guidance information is synchronously displayed on the electronic display panel of the aircraft guiding system and the mirroring display region of the display screen of the operator panel;
   a video recording unit for recording the guidance information displayed on the display screen; and
   a built-in recording unit for recording the integrated guidance information from the electronic display panel and a time stamp of the integrated guidance information.

2. The reviewing and video synchronization device according to claim 1, wherein the operator panel further includes an image scanner for scanning information displayed on the display screen and provides the scanning to the video recording unit.

3. The reviewing and video synchronization device according to claim 1, wherein the operator panel further includes an emergency switch connected to the operator panel, for stopping operation during emergency.

4. The reviewing and video synchronization device according to claim 1, wherein the operator panel further includes a waterproof casing for enclosing the display screen, and the keys are disposed outside the waterproof casing.

5. The reviewing and video synchronization device according to claim 4 wherein the display screen is a touchscreen including the mirroring display region for displaying an information displayed on the electronic display panel, a touchscreen key region, and a supplemental information region for displaying additional information of the aircraft.

6. The reviewing and video synchronization device according to claim 5, wherein the additional information displayed in the supplemental information region includes at least one of the following information: aircraft speed, aircraft offset distance, aircraft model, aircraft type, guidance status, and warning signal.

7. The reviewing and video synchronization device according to claim 1, further comprising a video camera arranged in front of the electronic display panel for recording the electronic display panel.

8. An aircraft guidance system having a reviewing and video synchronization ability, comprising:
   an electronic display panel;
   a laser scanner for shooting a laser beam to detect an aircraft and returning a scanning signal to generate a scanning signal;
   an operator panel having a display screen and a plurality of keys for generating an operation signal for guiding the aircraft, wherein the display screen of the operator panel includes a mirroring display region; wherein a scanning signal from an aircraft guiding system is transmitted to the operator panel, wherein the scanning signal includes an guidance information for guiding the aircraft to a predetermined position, and the guidance information is firstly displayed on an electronic display panel of the aircraft guiding system;

wherein the operator panel integrates the operation signal with the scanning signal into an integrated guidance information, and the integrated guidance information is synchronously displayed on the electronic display panel of the aircraft guiding system and the mirroring display region of the display screen of the operator panel;

a video recording unit for recording the guidance information displayed on the display screen; and a built-in recording unit for recording the integrated guidance information from the electronic display panel and a time stamp of the integrated guidance information.

9. The aircraft guidance system having a reviewing and video synchronization ability according to claim 8, wherein the operator panel further includes an image scanner for scanning information displayed on the display screen and provides the scanning to the video recording unit.

10. The aircraft guidance system having a reviewing and video synchronization ability according to claim 8, further comprising a video camera arranged in front of the electronic display panel for recording the electronic display panel.

* * * * *